United States Patent
Schmid

(10) Patent No.: US 9,616,838 B2
(45) Date of Patent: Apr. 11, 2017

(54) AIRBAG MODULE AND ASSEMBLY HAVING AN INSTRUMENT PANEL AND AN AIRBAG MODULE

(71) Applicant: TRW Automotive GmbH, Alfdorf (DE)

(72) Inventor: Juergen Schmid, Durlangen (DE)

(73) Assignee: TRW Automotive GmbH (DE)

( * ) Notice: Subject to any disclaimer, the term of this patent is extended or adjusted under 35 U.S.C. 154(b) by 51 days.

(21) Appl. No.: 14/377,517

(22) PCT Filed: Feb. 20, 2013

(86) PCT No.: PCT/EP2013/000483
§ 371 (c)(1),
(2) Date: Aug. 8, 2014

(87) PCT Pub. No.: WO2013/124055
PCT Pub. Date: Aug. 29, 2013

(65) Prior Publication Data
US 2016/0016528 A1    Jan. 21, 2016

(30) Foreign Application Priority Data

Feb. 21, 2012 (DE) .................. 10 2012 003 351

(51) Int. Cl.
*B60R 21/205* (2011.01)
*B60R 21/217* (2011.01)
*B60R 21/16* (2006.01)

(52) U.S. Cl.
CPC ........ *B60R 21/205* (2013.01); *B60R 21/2176* (2013.01); *B60R 2021/161* (2013.01); *B60R 2021/2173* (2013.01)

(58) Field of Classification Search
CPC . B60R 21/205; B60R 21/2176; B60R 21/201; B60R 2021/2173
See application file for complete search history.

(56) References Cited

U.S. PATENT DOCUMENTS 4,988,119 A * 1/1991 Hartmeyer ............ B60R 21/217
                                                         141/313
5,195,774 A * 3/1993 Morita .................. B60R 21/217
                                                         280/728.2
(Continued)

FOREIGN PATENT DOCUMENTS

WO    2005/100104    10/2005

*Primary Examiner* — Darlene P Condra
(74) *Attorney, Agent, or Firm* — Tarolli, Sundheim, Covell & Tummino LLP

(57) ABSTRACT

The invention relates to an airbag module (10) for being arranged on an instrument panel (5) comprising a fastening portion (22) provided for being arranged on the instrument panel (5), an inflator (16), an airbag (12), a receiving portion (26) for the airbag (12) extending from the inflator (16) to the fastening portion (22) and a retaining portion (24) which is accessible from outside of the receiving portion (26) and serves for retaining the inflator (16). The invention also relates to a subassembly comprising an instrument panel (5) and an airbag module (10) according to any one of the preceding claims, the fastening portion (22) of the airbag module (10) being connected to the instrument panel (5) and a retainer (28) formed separately from the airbag module (10) being provided which is connected to the retaining portion (24) of the airbag module (10).

20 Claims, 5 Drawing Sheets

(56) References Cited

U.S. PATENT DOCUMENTS

| | | | | |
|---|---|---|---|---|
| 5,358,270 A | * | 10/1994 | Kuretake | B60R 21/217 280/728.1 |
| 5,407,310 A | * | 4/1995 | Kassouni | B29C 70/76 29/525.02 |
| 5,549,324 A | | 8/1996 | Labrie et al. | |
| 5,727,810 A | * | 3/1998 | Elqadah | B60R 21/217 280/728.2 |
| 5,813,692 A | * | 9/1998 | Faigle | B60R 21/205 280/728.1 |
| 5,865,461 A | * | 2/1999 | Totani | B29C 37/0057 280/728.3 |
| 5,865,466 A | * | 2/1999 | Yamamoto | B60R 21/201 280/743.1 |
| 6,145,871 A | * | 11/2000 | Davis, Jr. | B60R 21/2165 280/728.2 |
| 7,533,898 B2 | * | 5/2009 | Yanai | B29C 65/0618 280/728.2 |
| 8,016,317 B1 | * | 9/2011 | Bruyneel | B60R 21/2171 280/728.2 |
| 2004/0026009 A1 | * | 2/2004 | Ponthieu | B60R 21/205 156/73.1 |
| 2005/0225059 A1 | * | 10/2005 | Lewis | B60R 21/2176 280/728.2 |
| 2005/0225062 A1 | * | 10/2005 | Dumbrique | B60R 21/2165 280/728.3 |
| 2007/0210616 A1 | * | 9/2007 | Wenzel | B29C 45/006 296/187.03 |
| 2008/0018081 A1 | * | 1/2008 | Yang | B60R 21/205 280/728.2 |
| 2009/0184496 A1 | * | 7/2009 | Hayashi | B60R 21/2165 280/728.3 |
| 2013/0001937 A1 | * | 1/2013 | Yamada | B60R 21/201 280/732 |
| 2015/0321635 A1 | * | 11/2015 | Luckett | B60R 21/215 280/728.3 |

* cited by examiner

AIRBAG MODULE AND ASSEMBLY HAVING AN INSTRUMENT PANEL AND AN AIRBAG MODULE

RELATED APPLICATIONS

This application corresponds to PCT/EP2013/000483, filed Feb. 20, 2013, which claims the benefit of German Application No. 10 2012 003 351.6, filed Feb. 21, 2012, the subject matter, of which are incorporated herein by reference in their entirety.

BACKGROUND OF THE INVENTION

The invention relates to an airbag module for being mounted on an instrument panel. The invention further relates to a subassembly comprising an instrument panel and such airbag module.

From the state of the art airbag modules are known that are arranged on an instrument panel. Usually they serve for the protection of a passenger in the case of accident and are arranged behind an exit opening provided in the instrument panel for the airbag. In the initial state the exit opening is closed by a flap portion of the instrument panel that releases the exit opening upon activation of the airbag module.

The airbag module usually includes a housing which may be trough-shaped and accommodates a folded airbag in its interior. On the housing also an inflator being in fluid communication with the airbag is disposed. The housing is disposed on the instrument panel below the exit opening so that upon activation of the inflator the deploying airbag can exit through the exit opening into the interior of the vehicle.

In the previously known airbag modules disposed on an instrument panel the housing has two functions. On the one hand, it acts as pressure canister which absorbs excess pressures occurring upon deployment of the airbag. On the other hand, it serves for retaining and fixing the inflator. For these reasons it is necessary for the housing to exhibit rather high rigidity.

SUMMARY OF THE INVENTION

The object of the invention consists in providing an airbag module that excels by lower weight.

In accordance with the invention, for achieving this object an airbag module for being arranged on an instrument panel is provided comprising a fastening portion arranged for being disposed on the instrument panel, an inflator, an airbag, a receiving portion for the airbag extending from the inflator to the fastening portion and a retaining portion that is accessible from outside of the receiving portion and serves for retaining the inflator. In order to achieve this object also a subassembly comprising an instrument panel and such airbag module is provided, the fastening portion of the inflator being connected to the instrument panel and a retainer configured separately from the airbag module being provided which is connected to the retaining portion of the airbag module. The invention is based on the finding that an overall lower weight can be obtained, when the housing previously provided for fastening the inflator is dispensed with. Instead functionally different separate components are used: on the one hand the receiving portion extending from the inflator to the fastening portion and substantially having a guiding function for the airbag and, on the other hand, the retainer being configured separately from the airbag module and fixing the inflator in its position.

According to a configuration of the invention, the receiving portion is a protective layer. The protective layer serves for protecting mechanical damage of the airbag by adjacent components below the instrument panel.

The receiving portion can be formed by a fabric housing. The fabric housing substantially has a guiding function for the airbag upon deployment of the latter.

Irrespective of the configuration of the receiving portion, the fastening portion can be multi-layered; concretely speaking it can be formed by an at least double protective layer or at least two fabric layers of the fabric housing. In this way, the comparatively highly stressed fastening portion can be designed to be reinforced with little expenditure.

It is also possible that the receiving portion is a thin-walled housing having less rigidity than the one that would be required for retaining the airbag during deployment. This housing, too, substantially has merely a protective function for the folded airbag.

Preferably, reinforcing elements and/or fastening means are injection-molded to the fastening portion. In this way the fastening portion can be reinforced and/or fixed to the instrument panel in a simple manner.

In accordance with a configuration of the invention, the retainer can be formed by a fabric strip. It has turned out that the inflator need not necessarily be fixed in a stationary manner but merely has to be fixed substantially in one position.

According to an alternative configuration, it is provided that the retainer is formed by a rigid bracket, especially made of plastic or metal. Such bracket in total has a by far lower weight than the previously used rigid housings, as the bracket can be designed to be comparatively narrow.

According to a configuration of the invention, it is provided that the retainer is connected to the instrument panel, especially even integrally formed with the instrument panel. As an alternative, the retainer may be provided to be arranged separately from the instrument panel. Hence it can be designed in dependence on the respective mounting situation of the retainers in each desired manner.

The inflator is preferably provided to be arranged in a floating manner on the retainer. This enables the inflator to be optimally centered as a function of external forces without undesired pretensions being exerted on the retainer.

BRIEF DESCRIPTION OF THE DRAWINGS

Hereinafter the invention will be described by way of two embodiments illustrated in the enclosed drawings, in which.

DESCRIPTION OF EMBODIMENTS

Figure 1:
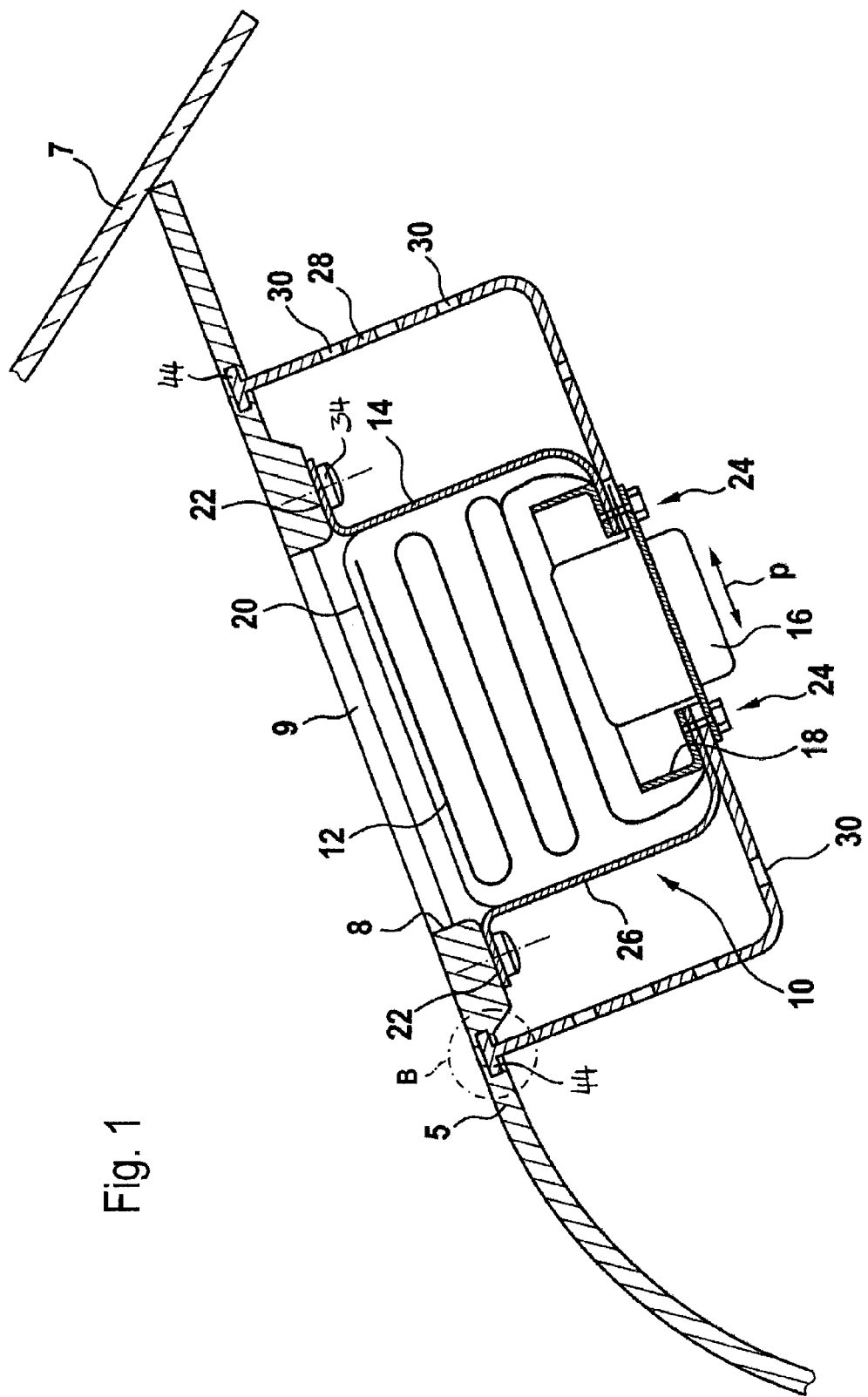
FIG. 1 schematically shows a section across a subassembly in accordance with a first embodiment of the invention.

In FIG. 1 an instrument panel 5 (also referred to as dashboard) is evident which is adjacent to a windscreen 7 at its upper right end in the Figure. Its left side in FIG. 1 faces a vehicle interior of a motor vehicle, especially a passenger seat. In the instrument panel 5 an exit opening 8 is provided which is closed by a flap 9 in the initial state.

An airbag module 10 including a folded airbag 12, a fabric housing 14, an inflator 16 and an airbag retaining ring 18 is arranged on the instrument panel 5. The airbag 12 is enclosed by a band 20 retaining the same in the folded compact state.

The fabric housing 14 includes a receiving portion 26 in which the airbag 12 is received and protected. The receiving portion is especially formed by the circumferential wall of the fabric housing 14. A fastening portion 22 connected to the instrument panel 5 on both sides of the exit opening 8 is attached to the receiving portion 26. On the side of the airbag module opposite to the fastening portion 22 the inflator 16 is tightly connected to the receiving portion.

The fabric housing 14 consists of a material as it is used, for example, also for the manufacture of airbags. It is evident that therefore the fabric housing 14 has no inherent stability.

On the side of the airbag module opposite to the fastening portion 22 a retaining portion 24 is provided which is accessible from outside of the fabric housing 14, especially from the "rear side" of the airbag module. The retaining portion 24 can be formed by a clamping area, by screw bolts or any other design which enables a separate component to be arranged on the outside of the airbag module, especially on the inflator 16.

A retainer 28 serving for positioning and disposing the inflator 16 in the vehicle is arranged on the retaining portion 24. The retainer 28 in this case is a rigid bracket. The material used can be plastic or metal.

In the shown embodiment the bracket 28 is arranged on the instrument panel 5. It is also possible to arrange the bracket 28 on other components fixed to the vehicle that are located below the instrument panel 5.

The bracket 28 does not surround the airbag module 10 on all sides but encompasses the same as a narrow strip only. Thus it constitutes no pressure-tight closure of the inflator. To save weight orifices 30 can be provided. This further illustrates the fact that the retainer 28 has no influence on the pressure conditions inside the airbag module 10 during deployment.

The retaining portion 24 of the airbag module and of the inflator 16, respectively, is arranged to be floating on the bracket 28 so that a relative movement between the bracket 28 and the inflator 16 is possible (cf. arrow P in FIG. 1).

Figure 2:
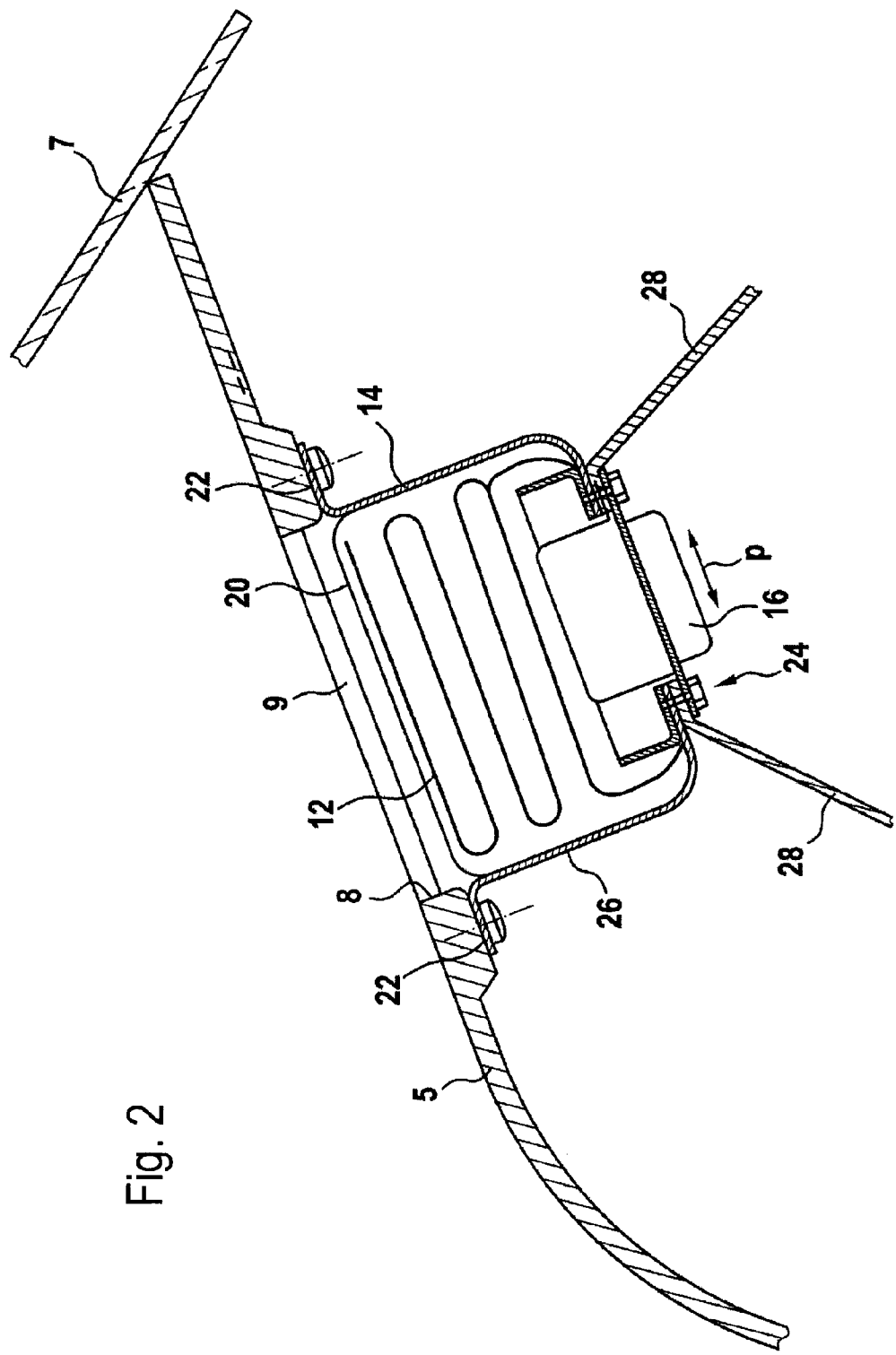
FIG. 2 schematically shows a section across a subassembly according to a second embodiment of the invention.

In FIG. 2 a second embodiment is illustrated, wherein the same reference numerals are used for the components known from the first embodiment. In this respect, the foregoing explanations are referred to.

The difference between the first and second embodiments consists in that in the second embodiment the retainer 28 is formed by a band, for example a fabric strip retaining the inflator 16 in a flexible position. Hence the inflator is "clamped" between the fabric housing 14 fixing the inflator upwards on the instrument panel 5 in FIG. 2 and the retainer 28 pulling the inflator away from the instrument panel, i.e. downwards in the Figure. The retainer 28 is disposed on other components fixed to the vehicle that are arranged below the instrument panel 5.

Figure 3:
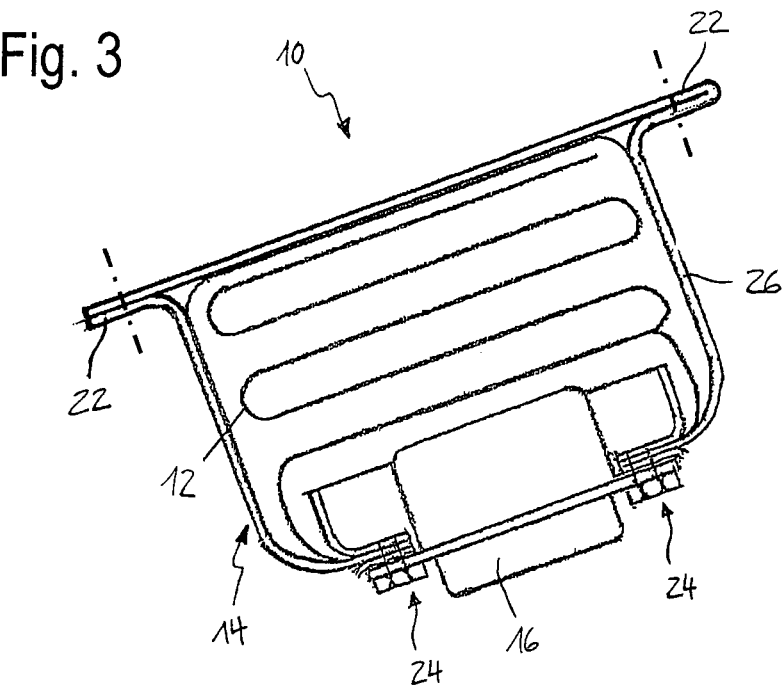
FIG. 3 schematically shows a section across an airbag module for a subassembly according to a third embodiment of the invention.

As material for the fabric housing 14 for example commercial polyamide fabric is suited, wherein in comparatively highly stressed housing portions plural fabric layers may be arranged to reinforce the fabric housing 14. In this context, FIG. 3 shows the airbag module 10 according to a third embodiment in which each of the highly stressed fastening portions 22 is multi-layered, concretely speaking by two fabric layers in each case, for reinforcing the fabric housing 14.

Alternatively or in addition to the multi-layered fabric arrangement, plastic material can be injection-molded around the fabric housing 14 in highly stressed housing portions so as to increase the strength and the stiffness of the fabric.

Figure 4:
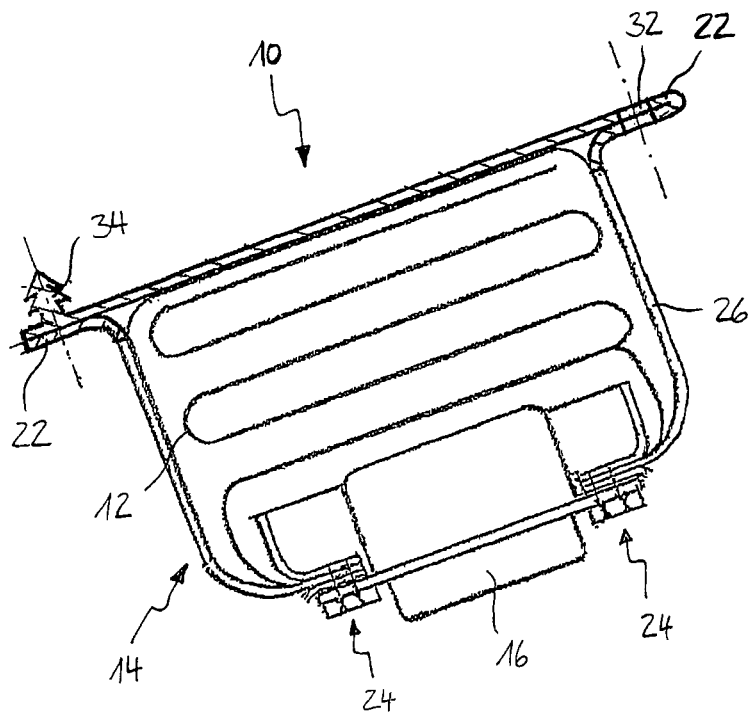
FIG. 4 schematically shows a section across an airbag module for a subassembly according to a fourth embodiment of the invention.

According to FIG. 4, the fastening portions 22 are surrounded by injection-molding to reinforce the fabric housing 14. In the area of the right-hand fastening portion 22 the plastic material includes, by way of example, a recess 32 for inserting a fastening means 34, especially a screw or a rivet. Alternatively, the fastening means 34 can be integrally formed in the plastic material as a latch element and can be injection-molded directly onto the fabric, as indicated in the area of the left-hand fastening portion 22.

As a matter of course, instead of polyamide fabric alternatively fabric made of steel, fiberglass, Kevlar or the like can be utilized.

Figure 5:
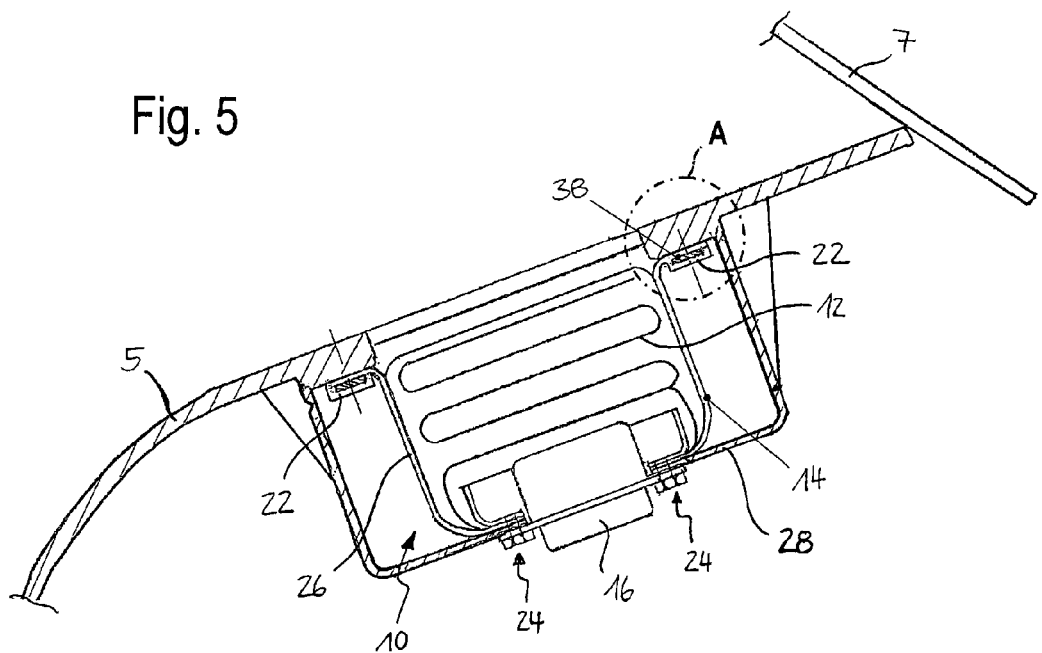
FIG. 5 schematically shows a section across a subassembly according to a fifth embodiment of the invention.

In a fifth embodiment according to FIG. 5, in the area of the fastening portions 22 the fabric housing 14 includes reinforcing elements 38 in the form of reinforcing shoulders for facilitating and reinforcing the mounting of the fabric housing 14 on the instrument panel 5. The reinforcing elements 38 are inserted in fabric loops 36 in FIG. 5 and are connected, especially screwed, to the instrument panel 5 by fastening means 34, for example (cf. FIG. 1).

Figure 6:
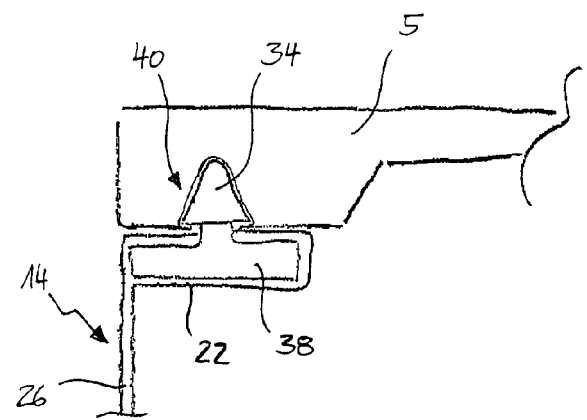
FIG. 6 schematically shows detail A of FIG. 5 according to an alternative design variant.

FIG. 6 shows the fastening detail A according to FIG. 5 in an alternative design variant. In this case the fastening means 34 configured as latch elements are integrally formed with the reinforcing elements 38 and can engage in corresponding recesses 40 of the instrument panel 5 so that the fabric housing 14 is connected to the instrument panel 5 by simple locking engagement.

Instead of inserting or stitching the reinforcing elements 38 into fabric loops 36 of the fabric housing 14, it is also imaginable as an alternative that the reinforcing elements 38 are made of plastic material and are injection-molded to the fabric housing 14 in the area of the fastening portions 22.

In the embodiment according to FIG. 5, the entire retainer 28 is configured as rigid bracket and is integrally formed with the instrument panel 5, especially injection-molded directly to the instrument panel 5.

Figure 7:
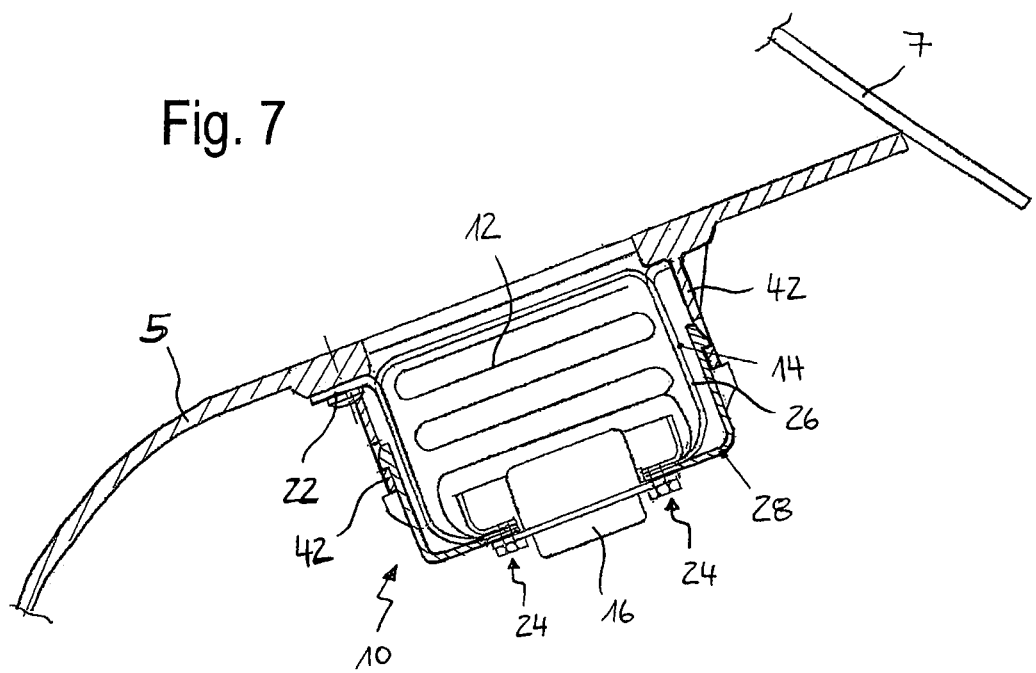
FIG. 7 schematically shows a view across a subassembly according to a sixth embodiment of the invention.

On the other hand, FIG. 7 illustrates a sixth embodiment in which merely fastening extensions 42 for the retainer 28 are integrated in the instrument panel 5. Preferably the instrument panel 5 is manufactured together with the fastening extensions 42 by injection molding. The retainer 28 in the form of a narrow rigid bracket in the present case constitutes a first latch element engaging in the fastening extensions 42 configured as second latch elements so that the retainer 28 can be latched with the instrument panel 5 with little effort.

In accordance with FIG. 1, the retainer 28 is completely pre-fabricated and includes ends 44 spread in T-shape which are injection-molded into the instrument panel 5 for anchoring the retainer 28.

Figure 8:
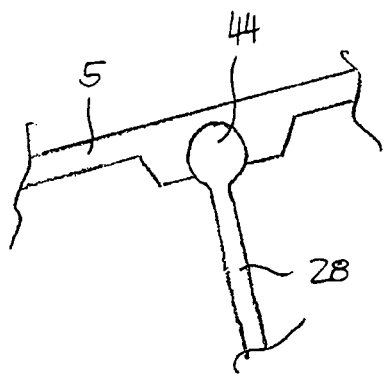
FIG. 8 schematically shows detail B of FIG. 1 according to an alternative design variant.
Figure 9:
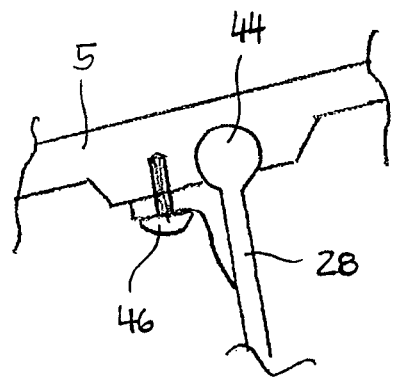
FIG. 9 schematically shows detail B of FIG. 1 according to another alternative design variant.

Each of the FIGS. 8 and 9 shows detail B of FIG. 1 with further alternatives for fastening the retainer 28 on the instrument panel 5. According to FIG. 8, the retainer 28 includes ends 44 spherically thickened in cross-section that are adapted to engage or be hooked in corresponding recesses of the instrument panel 5.

In the design variant according to FIG. 9, too, the retainer 28 is latched with or hooked into the instrument panel 5 analogously to FIG. 8. In addition, the retainer 28 and the instrument panel 5 are also screwed to each other by a lock screw 46 so as to ensure reliable and strong connection of the components.

The invention claimed is:

1. A subassembly comprising an instrument panel (5) and an airbag module (10) comprising a fastening portion (22) for being arranged on the instrument panel (5), an inflator (16), an airbag (12), a receiving portion (26) for the airbag (12) extending from the inflator (16) to the fastening portion (22) and a retaining portion (24) which is accessible from outside of the receiving portion (26) and serves for retaining and fixing the inflator (16) substantially in one position, wherein the fastening portion (22) of the airbag module (10) is connected to the instrument panel (5) and that a retainer (28) configured to be separate from the airbag module (10) is provided for fixing the inflator (16) substantially in one position, wherein the retainer (28) is formed by a rigid bracket.

2. The subassembly according to claim 1, wherein in that the retainer (28) is connected to the instrument panel (5).

3. The subassembly according to claim 2, wherein said retainer (28) is connected to the retaining portion (24) of the airbag module (10), and wherein the retainer (28) is integrally formed with the instrument panel (5).

4. The subassembly according to claim 1, wherein the retainer (28) is arranged separately from the instrument panel (5).

5. The subassembly according to claim 1, wherein the retainer comprises ends that are thickened in cross-section and are adapted to engage or be hooked in corresponding recesses of the instrument panel.

6. A subassembly comprising an instrument panel (5) and an airbag module (10) comprising a fastening portion (22) for being arranged on the instrument panel (5), an inflator (16), an airbag (12), a receiving portion (26) for the airbag (12) extending from the inflator (16) to the fastening portion (22) and a retaining portion (24) which is accessible from outside of the receiving portion (26) and serves for retaining and fixing the inflator (16) substantially in one position, wherein the fastening portion (22) of the airbag module (10) is connected to the instrument panel (5) and that a retainer (28) configured to be separate from the airbag module (10) is provided for fixing the inflator (16) substantially in one position; wherein the inflator is accessible from outside the subassembly.

7. The subassembly according to claim 6, wherein the receiving portion (26) is a protective layer.

8. The subassembly according to claim 6, wherein the receiving portion (26) is a fabric housing (14).

9. The subassembly according to claim 6, wherein the fastening portion (22) is multi-layered.

10. The subassembly according to claim 6, wherein the receiving portion (26) is a thin-walled housing the rigidity of which is lower than the rigidity required for retaining the airbag during deployment.

11. The airbag subassembly according to claim 6, wherein that reinforcing elements (38) and/or fastening means (34) are injection-molded on the fastening portion (22).

12. The subassembly according to claim 6, wherein the inflator (16) is arranged to be floating on the retainer (28).

13. The subassembly according to claim 6, wherein the fastening portion is attached directly to the instrument panel.

14. The subassembly according to claim 6, wherein the airbag module is secured to the instrument panel by fastening means disposed on a surface of the instrument panel that faces the airbag module.

15. The airbag subassembly according to claim 6, wherein a band extends between two opposing portions of the receiving portion to retain the airbag in a folded compact state.

16. An airbag module for being arranged on an instrument panel of a vehicle, comprising:
   an airbag;
   an inflator for providing inflation fluid for inflating the airbag;
   a fabric housing comprising a fastening portion connected to the instrument panel and a receiving portion that at least partially surrounds the airbag and is connected to the inflator, the fabric housing being configured to guiding deployment of the airbag;
   a retainer formed as a rigid bracket for supporting and positioning the inflator and the airbag relative to the instrument panel; and
   a retaining portion for connecting the airbag and inflator to a portion of the retainer that is spaced from the instrument panel.

17. The airbag module recited in claim 16, wherein the retainer at least partially surrounds the fabric housing and the airbag, and wherein the retaining portion is configured to float on the retainer so as to allow the airbag and inflator to move relative to the rigid retainer.

18. The airbag module recited in claim 17, wherein the retainer comprises ends that are thickened in cross-section and are adapted to engage or be hooked in corresponding recesses of the instrument panel.

19. The airbag module recited in claim 16, wherein the retainer is configured so that it has no influence on the pressure conditions inside the airbag during deployment.

20. An airbag module for being arranged on an instrument panel of a vehicle, comprising:
   an airbag;
   an inflator for providing inflation fluid for inflating the airbag;
   a fabric housing comprising a fastening portion connected to the instrument panel and a receiving portion that at least partially surrounds the airbag and is connected to the inflator, the fabric housing being configured to guiding deployment of the airbag;
   a retainer for supporting and positioning the inflator and the airbag relative to the instrument panel; and
   a retaining portion for connecting the airbag and inflator to a portion of the retainer that is spaced from the instrument panel;
   wherein the retainer comprises a band that cooperates with the fabric housing to support the inflator relative to the instrument panel, wherein the fabric housing is configured to pull the inflator toward the instrument panel and the band is configured to pull the inflator away from the instrument panel.

* * * * *